US010757104B1

(12) United States Patent
Goel

(10) Patent No.: US 10,757,104 B1
(45) Date of Patent: Aug. 25, 2020

(54) SYSTEM AND METHOD FOR AUTHENTICATION IN A COMPUTING SYSTEM

(71) Applicant: Veritas Technologies LLC, Mountain View, CA (US)

(72) Inventor: Vikas Goel, Sunnyvale, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 14/754,361

(22) Filed: Jun. 29, 2015

(51) Int. Cl.
*H04L 29/06* (2006.01)

(52) U.S. Cl.
CPC .............. *H04L 63/10* (2013.01); *H04L 63/08* (2013.01); *H04L 63/0884* (2013.01)

(58) Field of Classification Search
CPC ...... H04L 63/10; H04L 63/08; H04L 63/0884
See application file for complete search history.

(56) References Cited

U.S. PATENT DOCUMENTS

| | | | |
|---|---|---|---|
| 5,764,890 | A | 6/1998 | Glasser et al. |
| 5,784,463 | A | 7/1998 | Chen et al. |
| 6,088,451 | A | 7/2000 | He et al. |
| 6,216,202 | B1 | 4/2001 | D'Errico |
| 6,263,446 | B1 | 7/2001 | Kausik et al. |
| 6,275,892 | B1 | 8/2001 | Arnott |
| 6,314,425 | B1 | 11/2001 | Serbinis et al. |
| 6,324,537 | B1 | 11/2001 | Moran |
| 6,385,729 | B1 | 5/2002 | DiGiorgio et al. |
| 6,453,362 | B1 | 9/2002 | Bittinger et al. |
| 6,574,705 | B1 | 6/2003 | Peloquin et al. |
| 6,587,867 | B1 | 7/2003 | Miller et al. |
| 6,594,698 | B1 | 7/2003 | Chow et al. |

(Continued)

FOREIGN PATENT DOCUMENTS

JP 2008015934 A 1/2008

OTHER PUBLICATIONS

Tao et al., Cryptanalysis of two dynamic identity based authentication schemes for multi-server architecture, IEEE, China Communications, vol. 11, Issue 11, 2014 (Year: 2014).*

(Continued)

*Primary Examiner* — Luu T Pham
*Assistant Examiner* — Harvey I Cohen
(74) *Attorney, Agent, or Firm* — Kowert Hood Munyon Rankin and Goetzel PC; Rory D. Rankin

(57) ABSTRACT

A system and method for efficiently accessing Web resources. A directory service and an authentication service may be used to determine whether a login session attempt on a deployed device is successful. At least one deployed device in a system receives credentials from a user during a login request and requests authorization using the received credentials for both a login session and for accessing Web resources. The device sends the authorization request to Web services on a server hosting the Web resources. The Web services interact with an authentication service to verify authentication for the user. The device receives an access token upon verification for authorization for the given user and securely stores it. When a client program executing on the device requests access to the Web resources, the device sends an access request with a copy of the stored access token to the server hosting the Web resources.

10 Claims, 4 Drawing Sheets

(56) References Cited

U.S. PATENT DOCUMENTS

| | | |
|---|---|---|
| 6,606,651 B1 | 8/2003 | Linde |
| 6,615,264 B1 | 9/2003 | Stoltz et al. |
| 6,745,207 B2 | 6/2004 | Reuter et al. |
| 6,856,800 B1 | 2/2005 | Henry et al. |
| 6,944,732 B2 | 9/2005 | Thunquest et al. |
| 7,028,090 B2 | 4/2006 | McBrearty et al. |
| 7,111,324 B2 | 9/2006 | Elteto et al. |
| 7,134,138 B2 | 11/2006 | Scherr |
| 7,191,344 B2 | 3/2007 | Lin et al. |
| 7,191,467 B1 | 3/2007 | Dujari et al. |
| 7,231,526 B2 | 6/2007 | Hon et al. |
| 7,275,259 B2 | 9/2007 | Jamieson et al. |
| 7,328,287 B1 | 2/2008 | Arumugham et al. |
| 7,774,455 B1* | 8/2010 | Tock ........................ G06F 21/33 709/224 |
| 8,042,163 B1 | 10/2011 | Karr et al. |
| 8,429,712 B2* | 4/2013 | Robinson ................. H04L 63/08 380/255 |
| 8,484,711 B1* | 7/2013 | Coletta .................... H04L 63/00 705/35 |
| 8,555,357 B1 | 10/2013 | Gauvin |
| 8,769,304 B2 | 7/2014 | Kirsch |
| 8,843,997 B1 | 9/2014 | Hare |
| 8,893,293 B1 | 11/2014 | Schmoyer et al. |
| 8,925,053 B1 | 12/2014 | Mehta |
| 2003/0084171 A1 | 5/2003 | de Jong et al. |
| 2003/0084292 A1 | 5/2003 | Pierce et al. |
| 2003/0163725 A1 | 8/2003 | Feuser et al. |
| 2003/0172265 A1 | 9/2003 | Vu et al. |
| 2003/0187883 A1 | 10/2003 | Zelenka et al. |
| 2003/0204743 A1 | 10/2003 | Devadas et al. |
| 2004/0103325 A1 | 5/2004 | Priebatsch |
| 2004/0148526 A1 | 7/2004 | Sands et al. |
| 2004/0153451 A1 | 8/2004 | Phillips et al. |
| 2004/0255143 A1 | 12/2004 | Wemyss et al. |
| 2005/0204148 A1* | 9/2005 | Mayo .................. H04L 63/0815 713/185 |
| 2005/0216300 A1 | 9/2005 | Appelman et al. |
| 2006/0174323 A1 | 8/2006 | Brown et al. |
| 2006/0282678 A1* | 12/2006 | Ali .......................... G06F 21/34 713/185 |
| 2007/0180509 A1 | 8/2007 | Swartz et al. |
| 2007/0186106 A1 | 8/2007 | Ting et al. |
| 2008/0086759 A1 | 4/2008 | Colson |
| 2008/0109365 A1 | 5/2008 | Kulkarni et al. |
| 2008/0120411 A1 | 5/2008 | Eberle |
| 2008/0148366 A1 | 6/2008 | Wahl |
| 2009/0199276 A1* | 8/2009 | Schneider ........... H04L 63/0815 726/5 |
| 2010/0242092 A1 | 9/2010 | Harris et al. |
| 2010/0274815 A1 | 10/2010 | Vanasco |
| 2011/0023096 A1* | 1/2011 | Xiao ..................... H04L 63/0236 726/5 |
| 2011/0083173 A1 | 4/2011 | Baghdasaryan et al. |
| 2011/0113101 A1 | 5/2011 | Ye et al. |
| 2011/0225625 A1 | 9/2011 | Wolfson et al. |
| 2011/0307474 A1 | 12/2011 | Hom et al. |
| 2012/0246423 A1 | 9/2012 | Farey |
| 2012/0323717 A1 | 12/2012 | Kirsch |
| 2013/0030880 A1 | 1/2013 | Aidasani et al. |
| 2013/0036458 A1 | 2/2013 | Liberman et al. |
| 2013/0080911 A1 | 3/2013 | Klemm |
| 2013/0091540 A1 | 4/2013 | Chen et al. |
| 2013/0151617 A1 | 6/2013 | Davis et al. |
| 2013/0318347 A1 | 11/2013 | Moffat |
| 2014/0059658 A1 | 2/2014 | Stecher |
| 2014/0109175 A1 | 4/2014 | Barton et al. |
| 2014/0143545 A1 | 5/2014 | Mckeeman et al. |
| 2014/0149741 A1* | 5/2014 | Balakrishnan ........ G06F 21/335 713/159 |
| 2014/0189807 A1 | 7/2014 | Cahill et al. |
| 2014/0189808 A1 | 7/2014 | Mahaffey et al. |
| 2014/0215548 A1* | 7/2014 | Subramanya ........... H04L 63/08 726/1 |
| 2014/0282964 A1 | 9/2014 | Stubblefield |
| 2014/0282983 A1* | 9/2014 | Ju ....................... H04L 63/0823 726/8 |
| 2014/0289808 A1 | 9/2014 | Blanke |
| 2014/0289833 A1 | 9/2014 | Briceno et al. |
| 2014/0359734 A1 | 12/2014 | Natividad |
| 2015/0089575 A1* | 3/2015 | Vepa .................... H04L 41/0893 726/1 |
| 2015/0089597 A1* | 3/2015 | Srinivasan .......... H04L 63/0815 726/4 |
| 2015/0106905 A1* | 4/2015 | Fang .................... H04L 63/0815 726/8 |
| 2015/0163206 A1 | 6/2015 | McCarthy et al. |
| 2015/0319174 A1 | 11/2015 | Hayton et al. |
| 2015/0332067 A1 | 11/2015 | Gorod |
| 2016/0021097 A1* | 1/2016 | Shrotri .............. H04W 12/0609 726/8 |
| 2016/0087957 A1 | 3/2016 | Shah et al. |

OTHER PUBLICATIONS

Hwang et al., Password authenticated key agreement protocol for multi-servers architecture, IEEE, 2005 International Conference on Wireless Networks, Communications and Mobile Computing, 2005, vol. 1 (Year: 2005).*

Yang-Enabling Use of Single Password over Multiple Servers in Two-Server Model, IEEE, 10th IEEE Internl Conf on Computer and Information Technology, 2010 (Year: 2010).*

Gibson, et al., "File Server Scaling with Network-Attached Secure Disks", Proceedings of the 1997 ACM SIGMETRICS International Conference on Measurement and Modeling of Computer Systems, Jun. 15-18, 1997, 13 pages, ACM, New York, NY, USA.

Gibson, et al., "Filesystems for Network-Attached Secure Disks", CMU-CS-97-118, Jul. 1997, 18 pages.

Gibson, et al., "A Cost-Effective, High Bandwidth Storage Architecture", Proceedings of the 8th International Conference on Architectual Support for Programming Languages and Operating Systems, Oct. 1, 1998, 12 pages, ACM, New York, NY, USA.

Czerwinski, et al., "An Architecture for a Secure Service Discovery Service", Proceedings of the 5th Annual ACM/IEEE International Conference on Mobile Computing and Networking, Aug. 1, 1999, pp. 24-35, ACM, New York, NY, USA.

Sandhu, et al., "Access Control: Principles and Practice", IEEE Computer, Sep. 1994, pp. 40-48.

Clark, Elizabeth, "Fibre Channel SAN Security", Sep. 4, 2002, 5 pages, http://www.networkmagazine.com/shared/article/show/Article.jthml?articleId=8703406. [Retrieved May 17, 2005].

King, Bill, "LUN Masking in a SAN", QLogic Communications, Inc., Oct. 8, 2001, 12 pages.

Goel, Vikas, U.S. Appl. No. 14/747,440, entitled "System and Method for Centralized Configuration and Authentication", filed Jun. 23, 2015, 39 pages.

International Search Report and Written Opinion in International Application No. PCT/US2016/038835, dated Sep. 13, 2016, 11 pages.

"pGina User's Guide", Jul. 9, 2013, 5 pages, http://pgina.org/docs/v3.1/user.html. [Retrieved Sep. 5, 2016].

Loos, Johan, "How to Logon with Domain Credentials to a Server in a Workgroup", Mar. 14, 2013, 51 pages, Version 1.0, http://www.accessdenied.be/blog/documentation/How%20to%20Logon%20with%20Domain%20Credentials%20to%20a%20Server%20in%20a%20Workgroup.pdf. [Retrieved Sep. 5, 2016].

Futagawa, Jun, "Integrating Network Services of Windows and UNIX for Single Sign-On", Proceedings of the 2004 International Conference on Cyberworlds, Nov. 18, 2004, pp. 323-328, IEEE Computer Society, Washington, D.C., USA.

Non-Final Office Action in U.S. Appl. No. 14/747,440, dated Apr. 11, 2017, 21 pages.

Sokolov et al., U.S. Appl. No. 14/749,420, entitled "Techniques for Administering User Online Authentication", filed Jun. 24, 2015, 32 pages.

Non-Final Office Action in U.S. Appl. No. 14/749,420, dated Jul. 27, 2016, 16 pages.

(56) References Cited

OTHER PUBLICATIONS

Final Office Action in U.S. Appl. No. 14/749,420, dated Dec. 30, 2016, 19 pages.
Non-Final Office Action in U.S. Appl. No. 14/749,420, dated Apr. 20, 2017, 23 pages.
Final Office Action in U.S. Appl. No. 14/749,420, dated Oct. 27, 2017, 21 pages.
Non-Final Office Action in U.S. Appl. No. 14/749,420, dated Mar. 27, 2018, 25 pages.
Final Office Action in U.S. Appl. No. 14/749,420, dated Oct. 15, 2018, 26 pages.
Non-Final Office Action in Japanese Patent Application No. 2017-565701, dated Jan. 22, 2019, 7 pages.
Non-Final Office Action in U.S. Appl. No. 14/749,420, dated Mar. 28, 2019, 24 pages.

* cited by examiner

SYSTEM AND METHOD FOR AUTHENTICATION IN A COMPUTING SYSTEM

BACKGROUND OF THE INVENTION

Field of the Invention

This invention relates to the field of secure network communication and, more particularly, to efficiently accessing web resources for client applications.

Description of the Related Art

As computer memory storage and data bandwidth increase, so does the amount and complexity of data that business and industry manage each day. Data management operations capable of creating, capturing, storing, distributing, protecting and consuming information become complex as the data size grows. In addition, data management operations, such as operations used in enterprise information management, provide regulatory compliance. Regulatory compliance ensures the accuracy and completeness of data contained in files, reports and other data structures as well as consistent data across the enterprise.

Different types of servers are deployed across the enterprise to provide these operations. These servers may be used in a data center, in a remote or branch office, and in virtual environments. For example, the environment may use multiple servers to provide Web-based or Cloud-based applications to end users. These types of applications reside on remote servers rather than on local machines or local communication devices. These applications may not consume an appreciable amount of storage space, if any, on local machines or communication devices and provide the interactivity of a local desktop or local on-machine application while being portable. Maintenance of the applications may occur at a single remote location.

The data being managed in the enterprise or small business environment may be partitioned into web resources, which are accessed, modified, moved, removed and so on by at least Web-based applications and Cloud-based applications. The Web resources may include files, documents, storage volumes, and any other target of a Web-based identifier. The Web-based identifier may include a uniform resource locator (URL), a uniform resource identifier (URI), an internationalized resource identifier (IRI), and the like.

Accessing the Web resources typically includes authorization steps to provide security. A trusted authentication service performs this security measure. A given user provides credentials which are sent to the authentication service for verification. Each time the given user executes a client application requesting access to Web resources in the environment, the client application again prompts the given user for the credentials. Alternatively, each time the given user executes a non-interactive process, such as batch jobs through a scripting language, requesting access to the Web resources in the environment, the non-interactive process does not prompt for the credentials and accordingly fails to obtain access as authentication fails.

In view of the above, improved systems and methods for efficiently accessing web resources for client applications are desired.

SUMMARY OF THE INVENTION

Systems and methods for efficient access of Web resources are contemplated. In various embodiments, a device is deployed among multiple devices in a business environment, such as a relatively small business environment or alternatively a large enterprise environment. In some embodiments, the devices may be purpose-built backup appliances (PBBAs). The PBBA may also be referred to as a storage appliance. In other embodiments, the device is a backup server. The environment may include a directory service and an authentication service. In some embodiments, each of the directory service and the authentication service is on a separate corresponding server. In addition, the environment may include Web resources on one of these servers or on a separate Web server.

Connections between the devices and between the servers and the devices may include wireless connection, direct local area network (LAN) connections, wide area network (WAN) connections such as the Internet, a router, transmission control protocol/internet protocol (TCP/IP) hardware and/or software, and so forth. One or more of the servers and the deployed devices may be located locally onsite, remotely at another site or branch office, or accessed through a cloud-based network.

In various embodiments, one or more of the deployed devices receives credentials corresponding to a login request from a given user for a login session (e.g., a secure shell session). During login authorization, the device uses the received credentials to request authorization for creating both the login session and for accessing Web resources through a Hypertext Transfer Protocol (HTTP) session on the device. In various embodiments, the device sends an authorization request with the credentials to Web services on a Web server. The Web services interact with an authentication service to determine whether the given user is authorized to have the login session and the HTTP session.

The device then receives an access token from the Web services upon verifying authorization for the given user and stores the access token. When a client program executing on the device requests access to Web resources, the user is not prompted for credentials to gain access. Rather, the device sends an access request with a copy of the stored access token to the server hosting the Web resources.

These and other embodiments will be appreciated upon reference to the following description and accompanying drawings.

Figure 1:
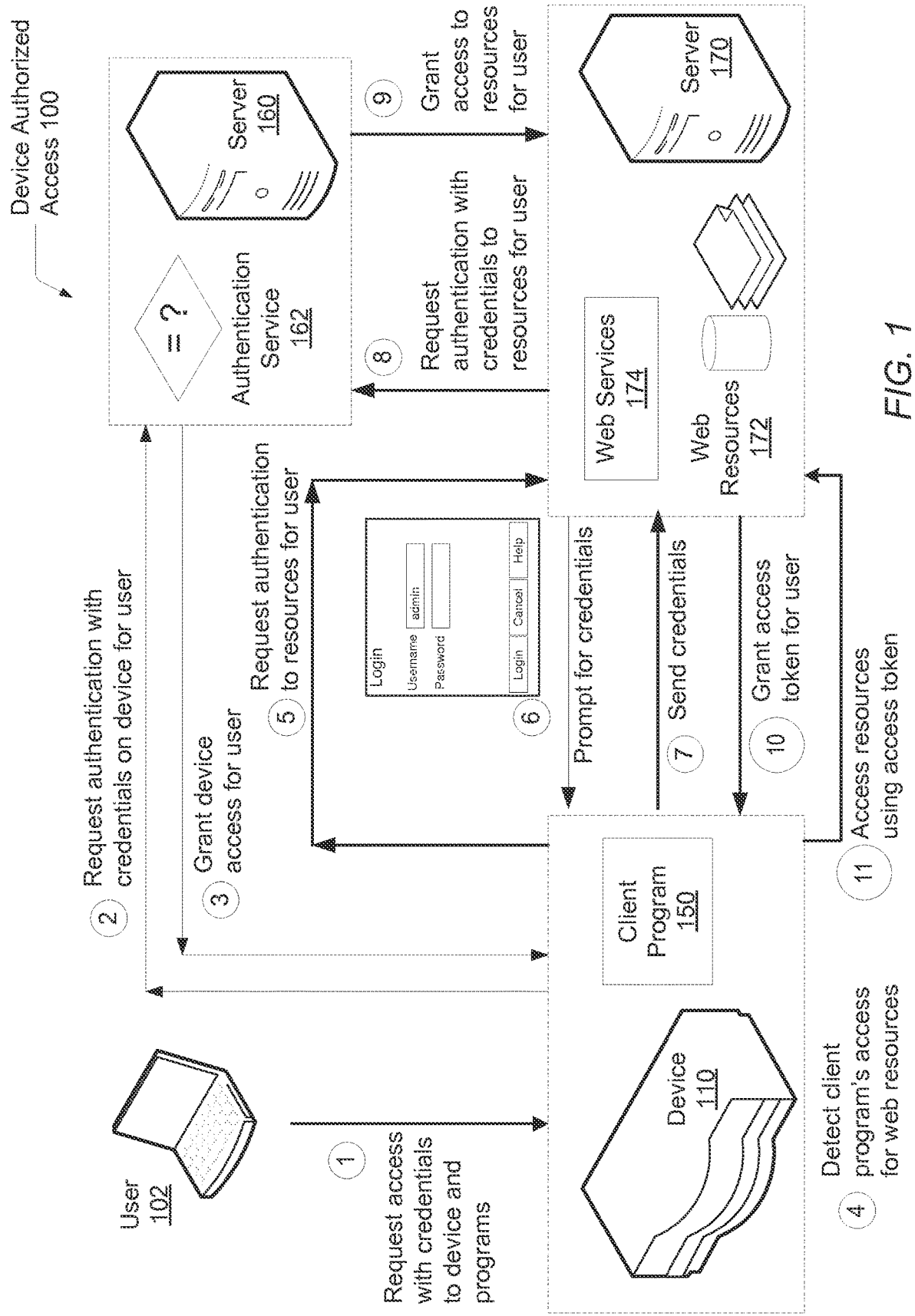
FIG. 1 is a generalized block diagram illustrating one embodiment of device authorized access.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of device authorized access 100 is shown. In the embodiment shown, a single device 110 is connected to at least servers 160 and 170. However, in various other embodiments, multiple devices are connected to the servers 160 and 170 and connected to one or more other devices. The other multiple devices are not shown for ease of illustration. As shown, the server 160 includes a user authentication service 162, which may also be referred to as an authentication service 162 or an authorization service.

In some embodiments, a user directory service (not shown) is also used along with the authentication service 162 during a login process by a user attempting to gain login access to the device 110. In some embodiments, each of the user directory service and the authentication service 162 executes on a same server. In other embodiments, the user directory service and the authentication service execute on separate servers. In various embodiments, the login request may be conveyed to the device 110 from another computing device 102. The login request may include credentials such as at least a username and a password.

One or more of the servers 160 and 170 may be a local server. Alternatively, one or more of the servers 160 and 170 may be a remote server. In other embodiments, one or more of the user directory service and the authentication service 162 is a cloud-based application.

In some embodiments, the device 110 is a type of storage, such as a disk storage, a backup server, a Network-Attached Storage (NAS) device, a Storage Area Network (SAN) device, or other. In other embodiments, the device 110 is a purpose-built backup appliance (PBBA). The PBBA may also be referred to as a storage appliance. Typically, storage appliances are a server based on common-used and certified server-hardware sold together with software, wherein the hardware and the software are provided by a single vendor. The storage appliance may include the server, data storage, an operating system, backup software and deduplication software. The all-in-one approach for the storage appliance may lead to relatively quick install (deploy) times. The storage appliance may provide storage, enable storage on another appliance or another storage medium, and/or provide deduplication for both physical systems and virtual systems.

The storage appliances typically provide data storage with capacities between 4 terabytes (TB) and 500 TB. As a result, the storage appliances may replace tape-based backup and recovery processes. In other environments, such as enterprise environments and mainframe environments, the storage appliances may be deployed alongside tape-based systems. The storage appliances may be used for cloud-based storage or on premise storage.

In yet other embodiments, the device 110 is a server unlike the storage appliance as the server may not be shipped with installed software from a single vendor. In various embodiments, the user computing device 102 is a laptop, a desktop, a tablet, another server, or other computing device able to connect to the device 110. The connections between the user computing device 102, the device 110 and the servers 160 and 170 may include a variety of techniques including wireless connection, direct local area network (LAN) connections, wide area network (WAN) connections such as the Internet, a router, may further include remote direct memory access (RDMA) hardware and/or software, transmission control protocol/internet protocol (TCP/IP) hardware and/or software, router, repeaters, switches, grids, and/or others. As described earlier, each of the device 110 and the servers 160 and 170 may be located onsite or may be cloud-based.

As shown, a sequence of steps are used to describe a user gaining authenticated use of the device 110 and gaining authenticated access of the web resources 172. The environment using at least the user computing device 102, the device 110, and the servers 160 and 170 may utilize Web-based applications and Cloud-based applications to manage data. In some embodiments, the client program 150 is a Web-based backup and recovery application. Alternatively, the client program 150 is a Web-based application that creates, modifies and removes volumes. In addition, the client program 150 may create, mount and share a file system.

Generally speaking, Web resources are software components, artifacts, or data and metadata used by Web-based and Cloud-based applications for creating, modifying, rendering, removing, reading and so forth. The Web resources may include files, documents, storage volumes, and any other target of a Web-based identifier. The Web-based identifier may include a uniform resource locator (URL), a uniform resource identifier (URI), an internationalized resource identifier (IRI), and the like. Web resources are typically collected in a location such as in a subdirectory of a root directory for the Web-based application. In some examples, the subdirectory may be indicated as resources/resource-identifier.

Web resource identifiers are unique strings conforming to a given format such as [locale-prefix/][library-name/][library-version/]resource-name[/resource-version]. Taking the use of URLs as an example, the Web resource URL is an address that the client program 150 uses to access the Web resource. In the case that the Web resource is a backup server connected to a backup and recovery application, the corresponding address may use a format such as http://localhost:9399/api/backupServers/79460354-e7c8-6df2-45a7-01df2bcd9b2a. The format includes a base URL and a Web resource location.

Here, the base URL is an entry point to the backup and recovery application's RESTful API, which is further described shortly. The base URL in this example is http://localhost:9399/api/. The string "localhost" is the machine's name where the backup and recovery application is installed. For example, this string may identify the device 110 in the example shown in FIG. 1. The string "9399" is a port used to communicate with REST APIs associated with a Web service on server 170 used to access the Web resources 172 in the example shown in FIG. 1.

The Web resource location in the above example is /backupServers/79460354-e7c8-6df2-45a7-01df2bcd9b2a. The Web resource location identifies the path to the Web resource itself in the backup and recovery application's RESTful API. The Web resource location is suffixed to the base URL, forming the URL for the Web resource. The Web resource location may include a uniform resource name (URN). Both URL and URN are uniform resource identifiers (URIs). However, the URN is also associated with uniform resource characteristics (URC), which allows a user to add descriptive information associated with the Web resource in the URN such as an author name, a timestamp, a data size, and so forth. Additionally, the URN may include an entity identifier (ID), or key, that uniquely identifies the Web resource. In the above example, the key is 79460354-e7c8-6df2-45a7-01df2bcd9b2a. For the example of a name, accessing a collection of jobs, such as jobs setup for a given batch, may be identified by the URN/jobs7. The complete URL may be http://localhost:9399/api/jobs7.

The key value in the above example may remain valid for identifying an associated Web resource only during the time of the backup and recovery application's RESTful API work session. The application's RESTful API work session, or the work session for the client program 150 in the example, may also be referred to as a Hypertext Transfer Protocol (HTTP) session. The HTTP session is an authenticated and interactive session between the HTTP client (client program 150) and the HTTP server (server 170). The HTTP protocol is used for data communication on the World Wide Web, which is also referred to as "Web" or "web". The Web is an information system of interlinked hypertext documents (Web pages) and other digital resources, such as the above Web resources, that are accessed via the Internet.

In various embodiments, the machine-to-machine (client-server) data communication, which is maintained by processes known as Web services, between the device 110 and the server 170 over a network, such as the Internet, may allow manipulation of the Web resources 172 using a set of stateless operations. The Web services 174 are the processes executing on the server 170 communicating with at least the device 110. The Web application programming interface (API) used in this data communication may use relatively simple simpler representational state transfer (REST) based communication. An API that uses REST is referred to as a RESTful API. A RESTful API breaks down a transaction to create a series of smaller transactions, each of which performs a particular underlying function of the full transaction. This modularity provides developers with flexibility.

The REST architectural style is used by Web APIs within Web browsers. With an increase in the use of Web-based applications and Cloud-based applications, various APIs, such as RESTful APIs, are emerging to expose Web services. RESTful APIs communicate over the Hypertext Transfer Protocol (HTTP) with HTTP verbs or methods. The HTTP methods (verbs) indicate the action to be performed on an identified Web resource. The Web resource may represent pre-existing data. Alternatively, the Web resource may represent dynamically generated data. The HTTP/1.0 specification defines the HTTP methods (verbs) GET, POST and HEAD. The HTTP/1.1 specification further defines the HTTP methods (verbs) OPTIONS, PUT, DELETE, TRACE and CONNECT.

In various embodiments, the device 110 provides a command line interface (CLI) for the user on the computing device 102. The CLI provides a manner to repetitively execute a number of tasks in a fixed sequence as a batch job on the device 110. When the batch job utilizes conditional code, scripting may be used with the languages Java, Perl, Python and so forth. The CLI commands may be entered interactively by the user or passed to the CLI in files. The device 110 may provide the cURL ("see" URL) command line tool for retrieving, sending and modifying files and other data using the URL syntax. The cURL tool uses libcurl library, which is a client-side URL transfer library. This library supports multiple communication protocols including HTTP and credential authentication such as user-plus-password authentication. The cURL commands may allow a secure shell (SSH) session on the device 110 to access the Web services 174 on the server 170.

As shown in FIG. 1, a sequence of steps illustrate a user on the computing device 102 using a client program 150 on the device 110 to access the Web resources 172 on the server 170. For purposes of discussion, the sequence steps in this embodiment are shown in sequential order. However, some sequence steps may be performed concurrently. In sequence 1, the user sends a login request from the computing device 102 to the device 110. In various embodiments, the login request includes at least a username and a password as credentials. Responsive to the device 110 receiving the login request, a separate request may be sent from the device 110 to the user directory service (not shown) to verify a username or other identifier associated with the given user. The user directory service verifies whether the provided identifier identifies a valid user for the device 110 and sends a corresponding reply to the device 110. It is noted that while the present description describes a particular sequence for purposes of convenience, in various embodiments the order of the steps occurring may differ. Additionally, other steps may be include that are not shown, and in some embodiments some steps may be combined and some may be eliminated. All such embodiments are contemplated.

In addition, the user directory service may provide user role information to the device 110. The user role information may include a user role, such as a system administrator or a normal user; and privileges and permission for the user. The user directory service may provide the user role information during the verification of the existence of the user for the device 110. Alternatively, the user directory service may provide the user role information at a later time, such as during a second request after the user has been authenticated by the authentication service 162. Examples of the user directory service include Microsoft Active Directory, Linux Network Information Service (NIS), the Apache Directory, and so forth.

Responsive to receiving an indication indicating the user's credentials are verified as identifying an existence of the user for the device 110, in sequence 2, the device 110 sends a request for authentication to the authentication service 162 on the server 160. In other embodiments, the authentication service 162 executes on a same server as the user directory service. In some embodiments, the authentication service 162 is integrated with the user directory service. In yet other embodiments, the authentication service 162 is a Cloud-based application. In yet other embodiments, two or more of the user directory service, the authentication service 162, another authentication service for authenticating access of the Web resources 172, the client program 150 and the Web resources 172 are located on a same device or server. The authentication service 162 determines whether credentials, such as a password, provided by the user during the login attempt to the device 110 matches a stored authorized password for the user.

The request in sequence 2 to the authentication service 162 may include an encrypted version of the password provided by the user during the login request to the device 110. The device 110 may use a secure socket layer (SSL) to send the request to the authentication service 162. In some embodiments, a successful verification of authorized access for the user indicated in a response in sequence 3 from the authentication service 162 allows the device 110 to retrieve user role information for the user and to create a login session for the user. Some server-side Web application frameworks for implementing the authentication service 162 includes Microsoft ASP.NET, Kerberos Authentication Service, SafeNet Authentication Service, and so forth. In addition, the framework Spring Security may be used to provide features in enterprise applications such as the authentication service 162.

In sequence 4, it is detected that the client program 150 wants to access the Web resources 172. For example, the client program 150 executes a cURL command that includes a HTTP method (verb) identifying at least one of the Web resources 172. In response to this detection, in sequence 5, a transaction is sent to the Web service 174 requesting access of the Web resources 172. Without a valid access token, the Web services 174 initiates verification of the authenticity of the user. However, without credentials, the Web services 174 is unable to send a request to the authentication service 162.

In sequence 6, the Web services 174 sends a request for the user's credentials. The user may be prompted to provide credentials for accessing the Web resources 172. For example, a login window may be presented to request at least a username and a password. In sequence 7, the user-provided credentials are sent from the device 110 to the Web services 174. Although the user is already verified as an authenticated user for the device 110 and has a currently running login sessions, such as a secure shell (SSH) session, the user is still prompted to provide credentials for access of the Web resources 172.

In sequence 8, a request is sent from the Web services 174 on the server 170 to the authentication service 162 on the server 160. The request includes at least the credentials provided by the user. In various embodiments, the credentials may be encrypted and a copy of the encrypted values is included with the request sent from the Web services 174 to the authentication services 162. In some embodiments, the same authentication service 162 is used for authenticating the login on the device 110 and for authenticating access of the Web resources 172 on the server 170. In other embodiments, different authentication services may be used where the services are located on different servers. For example, a first authentication service may be used for authenticating the login on the device 110, such as the authentication service 162 on the server 160. A second authentication service may be used for authenticating access of the Web resources 172 on the server 170. The second authentication service may be located on the server 170 or another server (not shown).

In the embodiment shown, the authentication service for authenticating access of the Web resources 172 is located on server 160. Therefore, the sequences 8 and 9 are between the server 170 and the server 160. In other embodiments where the authentication service for authenticating access of the Web resources 172 is located on another server, the sequences 8 and 9 would be between the server 170 and the other server. The request in sequence 8 to the authentication service 162 may again include an encrypted version of at least the username and the password provided by the user.

Responsive to verifying authorized access of the Web resources 172 for the user, in sequence 9, a response indicating that the authorized access is verified is sent from the authentication services 162 to the Web services 174. An access token is generated for the HTTP session to be created on the device 110. When created on the device 110, the HTTP session may be accessed with cURL commands executed by the client program 150 on the device 110. The access token may also be referred to as a session identifier (ID) for the HTTP session. The purpose of the access token is to allow the client program 150 to send authenticated requests from the device 110 for accessing the Web resources 172 on behalf of the user using the computing device 102. In some embodiments, the authentication service generates the access token. In other embodiments, the Web services 174 generates the access token responsive to receiving an indication that the authorized access is verified.

The access token may have a finite lifetime, such on the order of minutes or hours. Responsive to detecting the access token expires, attempts to further use the access token fail. A new access token needs to be obtained. In sequence 10, the generated access token is sent from the server 170 to the device 110. In various embodiments, the access token is protected against interception through the use of a secure socket layer (SSL).

Responsive to receiving the access token, the device 110 has or establishes an HTTP session. The HTTP session executes on the device 110 with the login session, such as the SSH session that was created earlier in sequences 2-3. In sequence 11, a request or transaction is sent from the device 110 to the server 170. The request uses a communication protocol such as the RESTful API protocol. The Web resources 172 are accessed by the authenticated request, wherein the authenticated request includes a copy of the access token. The request may include an encrypted copy of the access token. The designated command, or HTTP method (verb), included in the request is executed on the Web resource of the resources 172 identified in the request. Although not shown, a corresponding response is sent from the server 170 to the device 110.

In various embodiments, sequences 5-11 may be repeated and the user prompted for credentials, such as in sequence 6. For example, the sequences 5-11 may be repeated each time the client program 150 executes commands that access the Web resources 172. In other examples, the sequences 5-11 may be repeated each time an obtained access token expires, which may be on the order of minutes. Alternatively, each time the given user executes a non-interactive process, such as batch jobs through a scripting language, requesting access to the Web resources in the environment, the non-interactive process does not prompt for the credentials and accordingly fails to obtain access as authentication fails.

Figure 2:
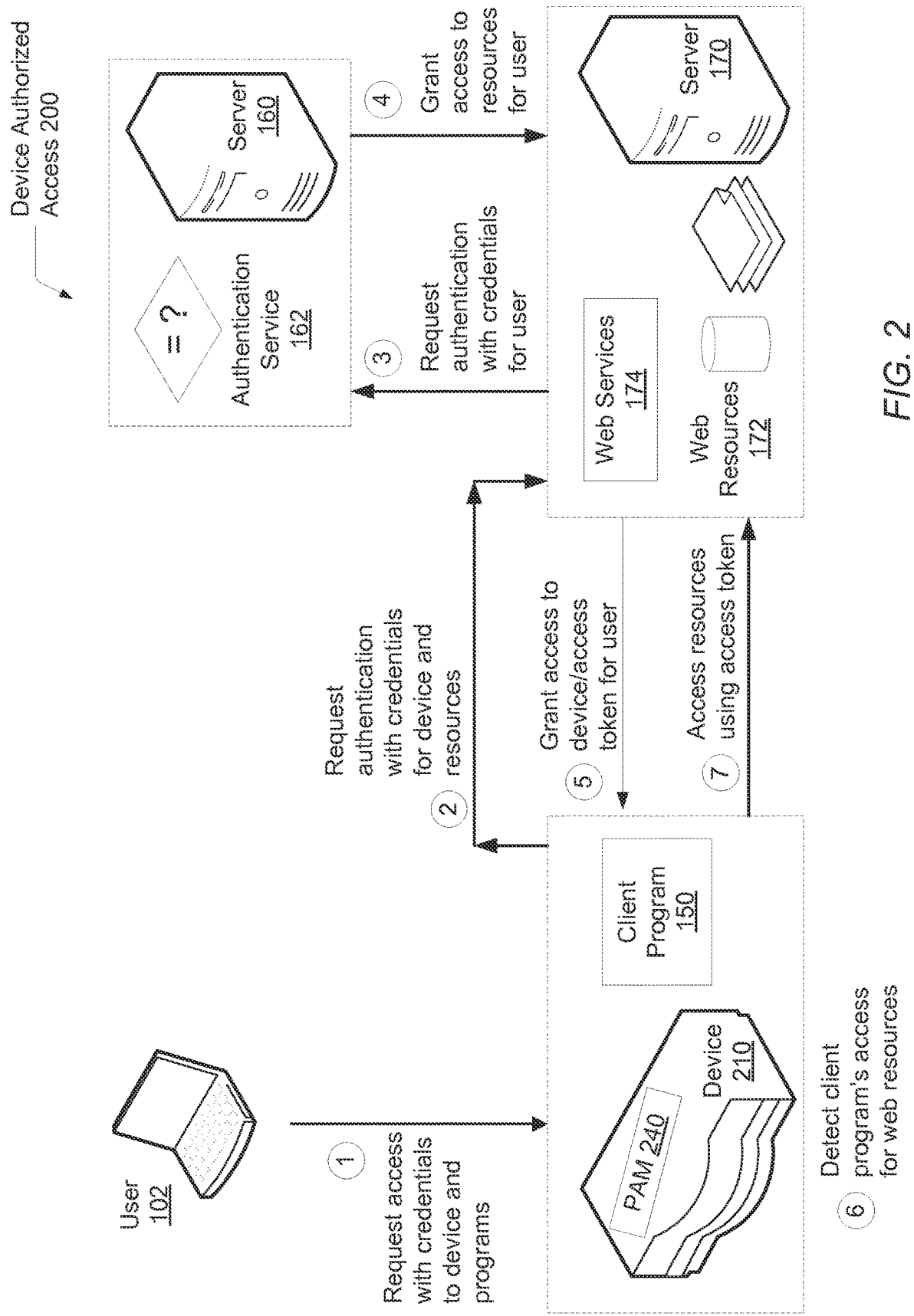
FIG. 2 is a generalized block diagram illustrating another embodiment of device authorized access.

Turning now to FIG. 2, a generalized block diagram of another embodiment of device authorized access 200 is shown. Circuitry and logic described earlier are numbered identically. In various embodiments, the device 210 may be a purpose-built backup appliance (PBBA) similar to the device 110 described earlier. The PBBA may also be referred to as a storage appliance. In other embodiments, the device 210 is a server. The device 210 may process a login request differently than the previous description for the device 110. Similar to the authorized access 100 shown in FIG. 1, a sequence of steps are used in FIG. 2 to describe a user gaining authenticated use of the device 210 and gaining authenticated access of the web resources 172. As shown, sequence 1 is the same as sequence 1 in the authorized access 100 descried earlier. Here, though, the previous sequence 7 replaces sequence 2. The device 210 includes a pluggable authentication module (PAM) 240 that sends an authentication request to the Web services 174 before a login session, such as a secure shell (SSH) session, is created.

Responsive to receiving the user login request from the computing device 102, the device 210 may use the received credentials for authenticating two sessions: the login session on the device 210 and the HTTP session on the device 210 for accessing Web resources. Although, no detection for an access of the Web resources 172 by the client program 150 has yet occurred, the device 210 may use the received credentials for the login session to authenticate both the login session and the HTTP session.

In the current sequence 2, the user-provided credentials are sent from the device 210 to the Web services 174. In the current sequence 3, a request is sent from the Web services 174 on the server 170 to the authentication service 162 on the server 160. The request includes at least the credentials provided by the user. The credentials may be encrypted and a copy of the encrypted values is inserted in the request sent from the Web services 174 to the authentication services 162.

The current sequence 3 is similar to the previous sequence 8 described earlier for the authorized access 100. As described earlier, in some embodiments, the same authentication service 162 is used for authenticating the login on the device 210 for the user and for authenticating access of the Web resources 172 on the server 170 for the user. In other embodiments, different authentication services are used.

When different authentication services are used, the Web service 174 may simultaneously send two requests, one request for each authentication service. Alternatively, the Web service 174 may send a first request to the authentication service for authenticating the user for the login session. In some embodiments, the Web service 174 may initially send a request to a user directory service as described earlier. Responsive to receiving a response indicating the user exists for the device 210, the Web service 174 may send a request to the authentication service for authenticating the user for the login session as described earlier. Responsive to receiving a response indicating the authentication is successful, the Web service 174 may send a second request to the authentication service for authenticating the user for the HTTP session. In both cases, each of the requests sent to authentication services may again include an encrypted version of at least the username and the password provided by the user.

The current sequence 4 may be similar to the previous sequence 9 with some changes. For example, in the current sequence 4, responsive to a successful verification of authorized access for the user to login to device 210 and to gain access to the Web resources 172, the authentication service 162 allows the device 210 to retrieve user role information for the user and an access token is generated for the HTTP session. In some embodiments, the authentication service generates the access token. In other embodiments, the Web services 174 generates the access token (e.g., responsive to receiving in sequence 4 the response indicating the authorized access is verified). Various such embodiments are possible and are contemplated.

In sequence 5, the generated access token is sent from the server 170 to the device 210. In various embodiments, the access token is protected against interception through the use of a secure socket layer (SSL). Responsive to receiving the single access token from the server 170, the device 210 generates two sessions for the user based on the single login request: a login session, such as an SSH session, and an HTTP session. The device 210 securely stores the access token and allows the access token to be used for the established HTTP session for the user. Should the same user establish another HTTP session, the access token obtained in sequence 5 would not be available for the other HTTP session.

The current sequence 6 may be the same as the previous sequence 4, wherein it is detected that the client program 150 wants to access the Web resources 172. Here, the device 210 already has the access token. Accordingly, in sequence 7, the device 210 sends an access request or transaction to the server 170. The access request uses a communication protocol such as the RESTful API protocol and includes the access token.

Figure 3:
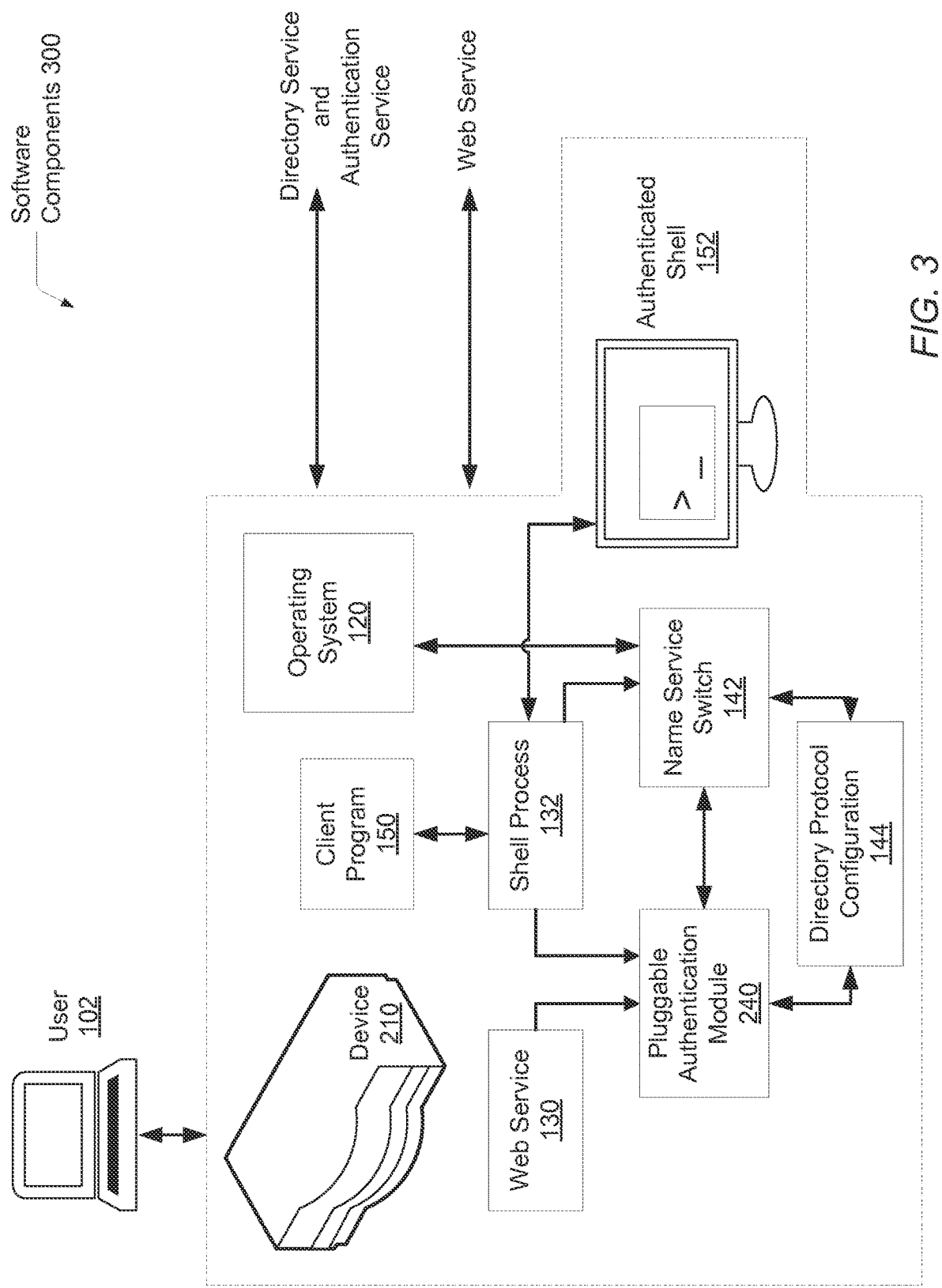
FIG. 3 is a generalized block diagram illustrating one embodiment of software components on the device.

Referring now to FIG. 3, a generalized block diagram of the software components 300 of the device is shown. The device 210 includes multiple software components such as at least an operating system (OS) 120, a web service 130, a shell service 132, a pluggable authentication module (PAM) 240, a name service switch (NSS) module 142, and a directory protocol configuration file 144. The OS 120 may be representative of any of a variety of specific operating systems, such as, for example, Symantec Appliance Operating System, Linux, or Sun Solaris. As such, the operating system may be operable to provide a software framework operable to support the execution of various programs such as deduplication, automatic backup, recovery and shell session or web-based browser session creation for authorized users, such as system administrators.

The shell process 132 provides a secure shell (SSH) user interface for accessing services of the OS 120. The shell service 132 provides a command-line interface (CLI) to the services of the OS 120 and other software applications on the device 210. When a user opens a secure shell (SSH) session and successfully logs in as an authorized user, the authenticated shell session 152 is provided to the user. The session 152 may be a CLI providing a manner to repetitively execute a number of tasks in a fixed sequence as a batch job on the device 210. When the batch job utilizes conditional code, scripting may be used with the languages Java, Perl, Python and so forth. The CLI commands may be entered interactively by the user or passed to the CLI in files. The authenticated shell session 152 may be provided on a local monitor onsite with the device 210. Alternatively, the authenticated shell session 152 may be provided on a remote monitor offsite when the user remotely logs in to the device 210.

The web service 130 may be any one of available internet World Wide Web browsers, such as Firefox, Internet Explorer, Google Chrome, and Safari. The web service 130 may be used to provide a graphical user interface (GUI) to the services of the OS 120 and other software applications on the device 210. When a user opens a particular web page and successfully logs in as an authorized user, the authenticated browser session is provided to the user. The authenticated browser session may be provided on a local monitor onsite with the device 210. Alternatively, the authenticated browser session may be provided on a remote monitor offsite when the user remotely logs in to the device 210. The GUI authenticated browser session may provide an easy-to-use interface for the user. As is well known to those skilled in the art, the GUI authenticated browser session may lack sufficient support for efficient automated operation sequences, such as sending batch jobs.

As shown, the device 210 is connected to a user directory service also referred to as simply a directory service. As described earlier, the directory service allows the sharing of information about users, systems, networks, services, and applications throughout a given network or a given work environment. The directory service may determine the existence of a given user in the work environment. For example, when a user attempts to login to the device 210, a request may be sent to the directory service to verify a username or other identifier associated with the given user. The directory service verifies whether the provided identifier identifies a valid user for the device 210 and sends a corresponding reply to the device 210.

In addition, the directory service may provide user role information to the device 210. The user role information may include a user role, such as a system administrator or a normal user; and privileges and permission for the user. The directory service may provide the user role information during the verification of the existence of the user for the device 210. As described earlier, the authentication service determines whether credentials, such as a password, provided by a given user during a login attempt to the device 210 matches a stored authorized password for the given user. Some server-side Web application frameworks for implementing the authentication service 162 includes Microsoft ASP.NET, Kerberos Authentication Service, SafeNet Authentication Service, and so forth. In addition, the framework Spring Security may be used to provide features in enterprise applications such as the authentication service.

Each of the directory service and the authentication service may follow an application protocol for accessing and maintaining distributed directory information services over an Internet Protocol (IP) network. However, the application protocol does not specify how the directory service operates. One example of such a protocol is the Lightweight Directory Access Protocol (LDAP), which is based on a client-server model. An application programming interface (API) for the application protocol, such as LDAP, may simplify the creation of directory service applications.

In order for the device 210 to use each of the directory service and the authentication service, both the device 210 and each of the servers hosting the directory service and the authentication service is configured to use the application protocol, such as LDAP. Libraries corresponding to the application protocol may be installed on the servers. One or more of the SSL and Transportation Layer Security (TLS) may be setup for encrypting communication with the servers. The directory protocol configuration file 144 is a configuration file that defines communication protocols for the libraries installed on the servers. In addition, the file 144 defines the location of the servers, a priority of which servers to contact for verification of users, and a communication protocol with at least the servers. In the LDAP example, the file 144 is the ldap.config file.

The name service switch (NSS) module 142 allows services to access appropriate databases on corresponding servers. The NSS module 142 organizes the services and corresponding databases into groups or modules. For example, the groups may include mail aliases, network protocols, host names, Ethernet numbers, user names, user group names, and so forth. For each group, the NSS module 142 may include multiple corresponding databases listed according to priority. A configuration file, such as an nsswitch.conf file, provides a lookup process for each database. For example, when determining whether a given user requesting a login to the device 210, the configuration file for the NSS module 142 indicates the location of the directory service. In some embodiments, the NSS module 142 is included in the OS 120.

The NSS module 142 may receive a username from the shell process 132 or the web service 130 during a login request from a given user. The NSS module 142 may determine to access the directory service, such as by accessing the configuration file for the NSS module 142, and further determine which server hosts the directory service. Therefore, the request to determine whether the given user exists for the device 210 is sent to the directory service. The request includes at least the username provided by the given user. The directory service sends a response to the device 210 after determining whether the given user exists for the device 210. In response to receiving an indication indicating the given user exists as a user for the device 210, the pluggable authentication module (PAM) 240 may be notified to determine whether the login request is authorized.

The PAM 240 provides a manner for establishing or verifying that a given user is who they claim to be. The PAM 240 includes a library that is a generalized API that includes a library of modules for authentication-related services. The PAM 240 allows a system administrator to add new authentication methods by installing new libraries. A configuration file, such as a pam.conf file, determines which authentication services to select.

When the PAM 240 receives an indication indicating that a given user requesting login to the device 210 exists for the device 210, the PAM 240 determines to access the authentication service, such as by accessing the configuration file for the PAM module 240, and further determines which server hosts the authentication service. In addition, the PAM module 240 may determine the location of Web services providing access to Web resources. The PAM module 240 may send a request to the Web service on a corresponding Web server to determine both whether the given user is authenticated for use of the device 210 and whether the user is authenticated for access of the Web resources. The request may be sent to the Web server hosting the Web services and the Web resources. The request includes at least an encrypted version of the username and the password provided by the given user. In this case, the PAM module 240 may be proactive in setting up a login session and an HTTP session for the user based on the single login request.

In response to receiving an indication indicating the given user is authorized for the device 210 and for accessing the Web resources, the device 210 may create a login session for the given user using the stored user role information. As shown, the authenticated secure shell (SSH) session 152 is provided to the user. In addition, the device 210 may create a HTTP session for the given user. Again, the login session, or the secure shell session, and the HTTP session are created based on the same single login request.

Figure 4:
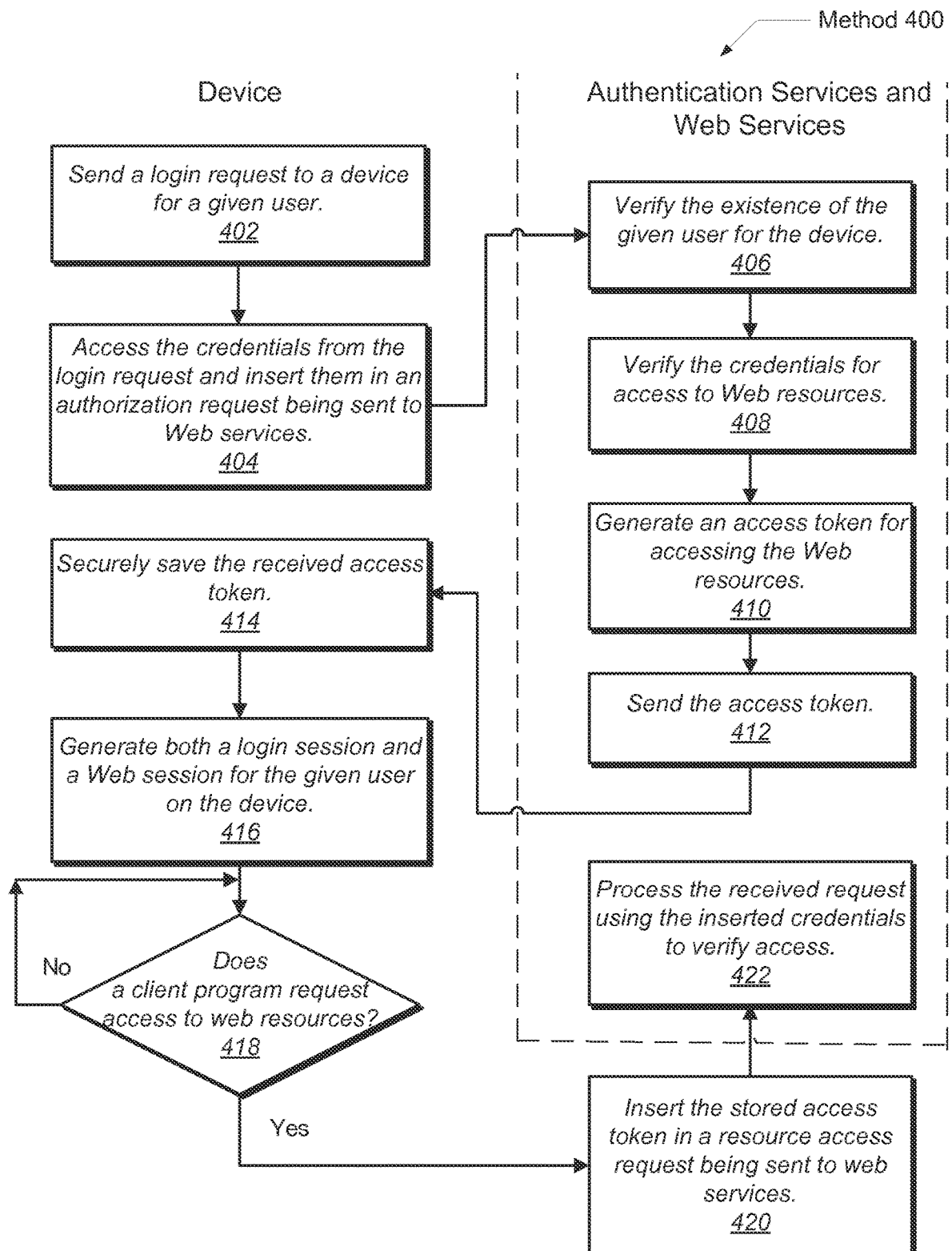
FIG. 4 is a flow diagram illustrating one embodiment of a method for efficiently accessing Web resources.

Turning now to FIG. 4, another embodiment of a method 400 for efficiently accessing Web resources is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 402, a given user attempts a login on a device. The login request includes at least a username and a password for the given user. In some embodiments, the device is a storage appliance. In other embodiments, the device is a backup server. The device may be deployed with multiple other devices in either a small business environment or an enterprise environment. In block 404, the credentials are accessed from the login request and inserted in an authorization request being sent to Web services.

In block 406, the credentials are used to verify the existence of the given user for the device. The credentials may be sent to a user directory service as described earlier. Alternatively, one or more of the credentials may be sent to the user directory service prior to block 406 and prior to sending an authorization request to the Web services. In block 408, the credentials are verified for access to Web resources. The credentials may be sent from the Web services to an authentication service.

In block 410, an access token is generated for accessing the Web resources. The access token may be generated by the authentication service. Alternatively, the access token may be generated by the Web server hosting the Web services and the Web resources. In block 412, the generated access token is sent from the Web services to the device. In block 414, the received access token is securely stored on the device so as to prevent any source or agent other than processes for the given user's login session from accessing the stored access token. In block 416, a login session, such as a secure shell (SSH) session, is generated for the given user on the device. The given user has both a login session and an HTTP session on the device based on the login request.

If a client program on the device executing under the given user's login session requests access to the Web resources (conditional block 418), then in block 420, a copy of the stored access token is inserted in a resource access request being sent to Web services on a designated Web server hosting the Web resources. In block 422, the Web server processes the received request after access is verified with the included access token.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An authentication system comprising:
    a storage device comprising a first set of resources; and
    a web server comprising a second set of resources, wherein the first set of resources comprises at least one Web-based application which requests access to the second set of resources when executed;
    wherein in response to receiving, from a user computing device, at the storage device a single request to establish a first session with the storage device with no request for access to the second set of resources by the user computing device, the request including credentials from a user, the storage device is configured to:
        send a single authorization request with the credentials to the web server requesting a single authorization for establishing both the requested first session with the storage device and a second session with the web server despite there being no detection of a request for access to the second set of resources by the user computing device,
        wherein the single authorization request is sent before the first session with the storage device is established to allow for the first set of resources to request access to the second set of resources;
        verify, by the storage device, an existence of the user on the storage device prior to sending said authorization request to the web server;
        send, by the web server, the credentials to an authentication service;
        verify, by the authentication service, that the user is authorized to access resources of each of the storage device and the web server;
        send, by the web server, said single authorization to the storage device allowing the user to establish both the first session and the second session, in response to receiving an indication that the user is authorized to access the first set of resources of the storage device and an indication that the user is authorized to access the second set of resources of the web server;
        wherein said single authorization comprises a single session token;
        receive the single authorization for the user to access both the first set of resources and the second set of resources; and
        establish, using said received single authorization, without generating another authorization, both the second session with the web server and the first session with the storage device based on the single authorization request.

2. The authentication system as recited in claim 1, wherein in response to receiving the session token, the storage device is further configured to store the session token for use by client programs on the storage device.

3. The authentication system as recited in claim 1, wherein in response to receiving a request by a client program associated with the second session that requests access to web resources of the web server, the storage device is configured to send a corresponding request to the web server, wherein the corresponding request includes an indication of said single authorization.

4. A device comprising:
    a processor;
    a memory configured to store instructions of a pluggable authentication management (PAM) module; and
    wherein in response to receiving, from a user computing device, a single request with credentials from a user to establish a single session with no request for access to the second set of resources by the user computing device, wherein the single session is a first session on the device comprising a first set of resources, the instructions of the PAM module are executable by the processor to:
        send a single authorization request with the credentials to the web server requesting a single authorization for establishing both the requested first session with the device and a second session with a web server despite there being no detection of a request for access to the second set of resources by the user computing device,
        wherein the single authorization request is sent before the first session with the device is established to allow for the first set of resources to request access to a second set of resources,
        wherein the web server comprises the second set of resources, and wherein the first set of resources comprises at least one Web-based application which requests access to the second set of resources when executed;
        verify, by the device, an existence of the user on the device prior to sending said authorization request to the web server;
        receive, from the web server, said single authorization to the device allowing the user to establish both the first session and the second session, wherein said single authorization indicates the web server received an indication that the user is authorized to access the first set of resources of the device and an indication that the user is authorized to access the second set of resources of the web server;

wherein said single authorization comprises a single session token;

establish, using said received single authorization, without generating another authorization, both the second session with the web server and the first session with the storage device based on the single authorization request.

5. The device as recited in claim 4, wherein the memory is further configured to store instructions of a name switch service (NSS) module, wherein the instructions of the NSS module are executable by the processor to send an identifier associated with the user to a directory service to verify an existence of the user on the device prior to sending said authorization request to the web server.

6. The device as recited in claim 4, wherein in response to receiving the session token, the instructions of the PAM module are further executable by the processor to store the session token for use by client programs on the device.

7. The device as recited in claim 4, wherein the memory is further configured to store instructions of an operating system, wherein in response to receiving a request by a client program associated with the second session that requests access to web resources of the web server, the instructions of the operating system are further executable by the processor to send a corresponding request to the web server, wherein the corresponding request includes an indication of said single authorization.

8. A method for executing on a processor, the method comprising:

wherein in response to receiving, from a user computing device, a single request with credentials from a user to establish a single session with no request for access to the second set of resources by the user computing device, wherein the single session is a first session on a storage device comprising a first set of resources:

sending a single authorization request with the credentials to a web server requesting a single authorization for establishing both the requested first session with the storage device and a second session with a web server despite there being no detection of a request for access to the second set of resources by the user computing device, wherein the single authorization request is sent before the first session with the storage device is established to allow for the first set of resources to request access to a second set of resources, wherein the web server comprises the second set of resources, and wherein the first set of resources comprises at least one Web-based application which requests access to the second set of resources when executed;

verifying, by the storage device, an existence of the user on the storage device prior to sending said authorization request to the web server;

receiving, from the web server, said single authorization to the storage device allowing the user to establish both the first session and the second session, wherein said single authorization indicates the web server received an indication that the user is authorized to access the first set of resources of the storage device and an indication that the user is authorized to access the second set of resources of the web server;

wherein said single authorization comprises a single session token;

establishing, using said received single authorization, without generating another authorization, both the second session with the web server and the first session with the storage device based on the single authorization request.

9. The method as recited in claim 8, wherein in response to receiving the session token, the method further comprises storing the session token for use by client programs on the user computing device.

10. The method as recited in claim 8, wherein in response to receiving a request by a client program associated with the second session that requests access to web resources of the web server, the method further comprises sending a corresponding request to the web server, wherein the corresponding request includes an indication of said single authorization.

\* \* \* \* \*